3,573,247
POLYUREA ELASTOMER SOLUTIONS IMPROVED BY ADDITIONS OF SPECIFIC INORGANIC SALTS

Ichiro Minobe, Ibaraki, and Keijiro Oda, Kobe, Japan, assignors to The Toyo Rubber Industry Co., Ltd., Osaka, Japan
No Drawing. Continuation-in-part of application Ser. No. 377,101, June 22, 1964. This application Oct. 11, 1967, Ser. No. 674,648
Claims priority, application Japan, July 13, 1963, 38/38,368
Int. Cl. C08f 45/34, 45/36, 45/54
U.S. Cl. 260—31.2
5 Claims

ABSTRACT OF THE DISCLOSURE

Novel solvent systems are provided consisting of an inorganic salt and a ketone or ester compound. Also provided are storage-stable polymer solutions prepared by utilizing such solvent system, and methods for preparing such solutions.

---

This application is a continuation-in-part of application Ser. No. 377,101, filed June 22, 1964.

This invention relates to a method of manufacturing storage-stable polymer solutions based on a polyurea elastomer, and more particularly, to a method of manufacturing the polymer solutions utilizing a new type of solvent system comprising an inorganic salt and a ketone or ester compound.

FIELD OF INVENTION

The designation "polyurea elastomers" mentioned in this invention signifies those elastic and substantially linear polyureas of high molecular weight which are obtained by the reaction of difunctional, relatively low molecular weight organic compounds, e.g. polyalkylene ether glycols or polyester glycols having a molecular weight of from 400 to 5000, with a molar excess of organic diisocyanate, to obtain a prepolymer having terminal isocyanate groups, and then chain extending the prepolymer with an organic diamine, i.e. hydrazine derivatives, etc.

These segmented polyurea elastomers are known to show excellent performances in uses for elastic fibers, films, fiber treating agents, leather coating agents, synthetic leathers, etc.

PRIOR ART

One of the defects in prior attempts to manufacture a solution of polyurea elastomers was that only an extremely limited number of solvents could be used. Examples of these solvents include such nitrogen substituted amides as N,N-dimethyl formamide and N,N-dimethyl acetamide; such sulfoxides as dimethyl sulfoxide; certain halogenated hydrocarbons such as methylene dichloride; some cyclic ethers such as tetrahydrofuran; and "Cellosolves" such as ethylene glycol methyl ether acetate and tetramethylurea. Furthermore, the solubility in these solvents is greatly affected by the kind and quantity of glycols, diisocyanates and diamines used, and thus there have developed considerable restrictions with the above mentioned solvents.

In some cases, mixed solvents such as acetone and N,N-dimethyl formamide, or tetrahydrofuran and N,N-dimethyl formamide were also used, but nitrogen substituted amides and sulfoxides have been commonly used for practical purposes.

These solvents however, are generally polar solvents of high boiling point and difficult to volatilize, and so as in the case of wet spinning, in which the polymer is coagulated in water, the process of recovering the solvents from the coagulation bath is complicated. To recover these solvents from the coagulation bath, it has been necessary to decrease the pressure or raise the temperature, and the solvents are partially decomposed during this process due to oxidation or hydrolysis.

There have also been attempts at utilizing concentrated aqueous solutions of inorganic salts, such as rhodanates, which dissolve polyacrylonitrile, without using these relatively expensive organic solvents, but not even a sign of dissolution was observed. The present inventors have also traced the literature concerning the use of tetrahydrofuran as a solvent for polyurea elastomers. As a result, it was discovered that tetrahydrofuran dissolves only those polyurea elastomers which contain a relatively small number of urea linkages, or have an extremely high molecular weight between the two nitrogen atoms of the employed diamine. These materials consequently have low tensile strength, low melting point, and slow coagulation rate in water. While it may be assumed that dissolution of polyurea elastomers could be considered in relation to the dissolving mechanism of such polymers as polyacrylonitrile and polyamides containing highly polar linkages, the polyurea elastomers in fact indicate a tendency considerably different from that of such polymers. The reason for this is assumed to be that, unlike polyamides, polyacrylonitrile, etc., in which amide groups and nitrile groups, having much cohesive energy and contributing to the intermolecular force of the hydrogen bond, are distributed at regular intervals, polyurea elastomers are comprised of segments concentrated with urea groups, urethane groups, and aromatic nuclei rich in cohesive energy, and segments of polyether or polyester poor in cohesive energy which are distributed in clusters and so render it more difficult to choose a suitable solvent for them.

According to the research of the inventors, it cannot be generally said that every polar solvent may be caused to dissolve polyurea elastomers by the addition of inorganic salts. For example, nitriles, nitro compounds, organic halides, pyridines, acid anhydrides and tertiary amines are solvents which have a polar group and yet are unable to dissolve polyurea elastomers, even when combined with an inorganic salt.

An advantage of this invention over the prior art is that a method of preparing polymer solutions is provided, wherein such polymer solutions are storage-stable.

BRIEF SUMMARY OF THE INVENTION

This invention provides a novel, and compared with the conventional type, a cheaper solvent system for polyurea elastomers, and also provides a method of manufacturing storage-stable polymer solutions of useful and versatile polyurea elastomers as well as the polymer solutions per se. Moreover, the organic solvents used in this invention have industrially useful properties because they have a generally low boiling point and thus may be easily recovered.

This invention pertains to the discovery that a useful and homogeneous polymer solution may be prepared by using as the solvent system, for the polyurea elastomer, a mixture of a least one inorganic salt of a divalent metal or trivalent transistion metal, and at least one saturated, unsubstituted ketone or ester.

DETAILED DESCRIPTION

For the solvent system of this invention, numerous different combinations of constituents are possible. Depending upon combinations of ketones, esters and inorganic salts, the dissolving power of the solvent system will vary, and their quantitative relationship may also be effected.

In the solvent system of this invention, the formation of a complex occurs between the ketone or ester and the inorganic salt. The complex thus formed functions as a solvent for polyurea elastomers, and accordingly, the amounts of the inorganic salt and ketone or ester employed are important in relation to the coordination number of the complex metal.

The polyurea elastomer of this invention is manufactured by the reaction of polyalkylene ether glycol or polyester glycol, having a molecular weight of 400–5000, with 1.05–2.00 molar ratio or organic diisocyanate against one mole of the glycol, to produce a prepolymer containing unreacted isocyanate groups at both ends of the chain, and then chain-extending the prepolymer with an organic diamine or hydrazine to obtain a high molecular compound. In the general case, a prepolymer is prepared by heating at a temperature of 60–120° C., without using a solvent. However, the reaction with a diamine is more easily carried out by chain-extending in a solvent.

The amount of polyurea elastomer soluble in the solvent system of this invention extends over a wide range, and appropriate concentrations may be chosen, depending on such factors as viscosity, drying properties, etc. Depending on the specific solvent system, a polyurea elastomer solution containing up to 85% by weight of polyurea elastomer may be prepared, although the invention is not particularly limited thereby.

It is to be noted that the organic diamines, mentioned in this invention, refer to diamines in a broad sense of the term, including such aliphatic, aromatic and heterocyclic diamines as ethylenediamine, propylene diamine, piperazine, p-phenylenediamine and methylenedianiline, but the diamines used in this invention include, of course, hydrazine, and derivatives of organic diamines and hydrazine. In general the organic diamines contain from 2 to 8 carbon atoms between the nitrogen atoms.

The polyalkylene ether glycols and polyester glycols employed in this invention include compounds having 3 to 5 carbon atoms between the ether or ester group, e.g. polypropylene ether glycol, polytetramethylene ether glycol, polypropylene-CO-tetramethylene ether glycol, polyethylene adipate glycol, polyethylene-CO-propylene adipate glycol, polytetramethylene adipate glycol, poly-ε-caprolactone glycol, all of which are preferred examples. Compounds other than those mentioned above, for example the polyurea elastomer from polyethylene ether glycol (molecular weight 1500), which was prepared by modifying the molecular weight using dibutylamine corresponding to 10% of the equivalent weight of diamine, may also be used.

The appropriate ketones used in this invention are lower aliphatic, saturated, unsubstituted ketones such as acetone, methylethyl ketone, diethyl ketone and diisopropyl ketone. In respect to dissolving power, as revealed by experiment in this invention, acetone and methylethyl ketone indicate the best efficacy, while it was noted that ketones of more than 10 carbon atoms are not suitable for the purposes of this invention.

The appropriate esters used in this invention are lower aliphatic, saturated, unsubstituted esters such as methyl-, ethyl-, propyl-, and isopropyl esters of formic acid, acetic acid and propionic acid, and also saturated, unsubstituted cyclic esters such as γ-butyrolactone and ε-caprolactone. Esters prepared from fatty acids or alcohols of more than 3 carbon atoms, or cyclic esters of more than 6 carbon atoms are not suitable for the purposes of this invention.

Though not essential, it has also been confirmed that these solvents may be mixed with each other, or with such other solvents as N,N-dimethyl formamide, dimethyl sulfoxide, etc., without giving adverse effect to the solubility of the polyurea elastomers.

The appropriate inorganic salts used in this invention are salts of divalent metals such as magnesium, copper, calcium and zinc, and also salts of trivalent transition metals such as iron, cobalt and nickel with strong monobasic inorganic acids. The preferred salts are the nitrates, chlorides and sulfates of the above mentioned metals. The inorganic salts may be used in the form of hydrates, but it is preferable that they be used in the anhydrous form. In some cases, a uniform complex may be formed with ketones and esters only when the inorganic salt is in the anhydrous form.

In order to assure the efficacy of the solvent system, it is important that the inorganic salts be uniformly dissolved in the ketones and esters.

If inorganic salts are mixed, such combinations as react with each other to form a salt which is insoluble in the ketone or ester employed are, of course, excluded from this invention.

The concentration of inorganic salts, used in this invention, is from $\frac{1}{10}$ to 1 mole per mole of the ketone or ester. However, in this case, they may be used up to the upper limit of the saturation concentrations or within the range permitted by the dissolution of the inorganic salts. In most cases the solubility of polyurea elastomers shows its maximum at a specific concentration of inorganic salt which will vary depending upon the particular salt and particular polyurea elastomer employed. If a salt solution of too high a concentration is used in dissolving polyurea elastomers, turbidity may result in the polymer solution.

In this invention, high molecular compounds other than polyurea elastomers may be used in conjunction with the polyurea elastomers. Examples of these compounds are polyvinyl chloride, polyvinyl acetate, cellulose acetate, polyamide, acrylonitrile-butadiene-styrene resin, chloroprene rubber, nitrile rubber, etc., or modified products of these compounds.

It is also possible of course, to add pigments, plasticizers, etc., if necessary or desirable.

The present invention is described in more detail in the following examples thereof.

EXAMPLE 1

A solid polyurea elastomer was prepared beforehand and its solubility in the various solvent systems was examined.

One mole of polypropylene ether glycol of molecular weight 1000, and 2.0 moles of diphenylmethane-p,p'-diisocyanate were reacted for 1.5 hours at 80° C. and thus the isocyanate terminated prepolymer having 5.02% of free isocyanate was prepared. Twenty grams of this prepolymer was dissolved in 80 grams of dimethyl formamide in 20% concentration. To this 20% dimethyl formamide solution was added 4.37 grams of 80% hydrazine hydrate. The mixture was reacted for 3 hours at 25° C., and thus a solution of polyurea elastomer was obtained.

Then, 600 grams of water was poured into the said polymer solution under a high-speed agitation and the polymer was coagulated. This was filtered, dried, and made into a powdered form.

At the ratio of 1 part of polyurea elastomer, 10 parts of organic solvent and 5 parts of metallic salts, these were admixed, and solventation tests were carried out. It was found that the solvent systems selected from the following combinations were effective to dissolve the polymer.

(1) Mixtures with acetone:
$MgCl_2 \cdot 6H_2O$, $Ca(NO_3)_2 \cdot 4H_2O$, $Ca(NO_3)_2$, $CaCl_2$, $ZnCl_2$, $Zn(NO_3)_2$, $CuCl_2 \cdot 2H_2O$, $FeCl_3$, $CoCl_2 \cdot 6H_2O$ (2) Mixtures with ethyl acetate:
$Ca(NO_3)_2 \cdot 4H_2O$, $Ca(NO_3)_2$, $ZnCl_2$, $CoCl_2 \cdot 6H_2O$ Next a further examination was carried out by varying the molar ratio in the system of acetone and anhydrous zinc chloride.

In order to examine the solubility of the polymer at a molar ratio of anhydrous zinc chloride to acetone of 1 mole to 4–10 moles, 10% polyurea elastomer based on 100% acetone was used. In the ratio of 4–8 moles of acetone to 1 mole of the metallic salt, a uniform solution was obtained, while at the molar ratio above 10 moles, the polyurea elastomer was not dissolved uniformly, but only swelled. Viscosity was the lowest at a 6 molar ratio of acetone, being 10.00 cps. at 25° C. In the system of acetone and anhydrous calcium nitrate, the polyurea elastomer was uniformly dissolved at a 3–12 molar ratio of acetone to 1 mole of anhydrous calcium nitrate, and viscosity was the lowest at the 8 molar ratio of acetone. At 20% polyurea elastomer based on 100% acetone, a transparent solution having a viscosity of 50.00 cps. at 25° C. resulted.

EXAMPLE 2

In a mixed solvent system of acetone and anhydrous calcium nitrate, a polyurea elastomer was prepared.

One mole of polypropylene ether glycol of molecular weight 1000, was reacted with 3 moles of diphenylmethane-p,p'-diisocyanate for 1.5 hours at 80° C., and thus the isocyanate terminated prepolymer having 5.32% of free isocyanate and a viscosity of 68.00 cps. at 25% C., was obtained.

Two hundred grams of this prepolymer was dissolved in a mixed solvent comprising 214 grams of anhydrous calcium nitrate and 650 grams of acetone. The concentration of the prepolymer solution was calculated at 19%, and the free isocyanate of the solution was titrated at 0.92%. To the above prepolymer solution 7.0 grams of ethylenediamine was added. The mixture was reacted for 3 hours at 20° C., and thus a uniform transparent solution having a viscosity of 2.30 cps. at 25° C. was obtained. The chain-extending reaction was complete after 3 hours at a reflux temperature of 35° C., and as a result of transparent solution having a viscosity of 266.00 cps. at 25° C. was obtained.

EXAMPLE 3

One mole of tetramethylene glycol (molecular weight: 1,000) was reacted with 2.5 moles of 2,4-toluene diisocyanate for 3 hours at 90° C., and the prepolymer thus obtained was made into a 20%-dimethyl formamide solution. One mole of ethylenediamine was added to the solution and reacted at 20–30° C.

The polyurea elastomer, thus obtained, was diluted to a 10% solution with N,N-dimethyl formamide solution, and, it was coagulated in water under agitation, and dried in the form of a solid polymer.

When 10 grams of this polymer was put in a mixed solvent consisting of 90 grams of acetone, 2.5 grams of anhydrous zinc nitrate and 0.5 gram of lithium chloride, it dissolved uniformly.

What is claimed is:

1. A polyurea elastomer solution comprising (a) a polyurea elastomer and, as solvent system, (b) acetone as organic solvent in admixture with at least one inorganic salt selected from the group consisting of hydrous magnesium chloride, hydrous or anhydrous calcium nitrate, calcium chloride, zinc chloride, zinc nitrate, hydrous copper chloride, iron chloride and hydrous cobalt chloride, or (c) ethyl acetate as organic solvent in admixture with at least one inorganic salt selected from the group consisting of hydrous or anhydrous calcium nitrate, zinc chloride and hydrous cobalt chloride, the relative molar ratio of organic solvent to inorganic salt being from 1 to 10.

2. A polyurea elastomer solution according to claim 1, wherein the solvent system is component b.

3. A polyurea elastomer solution according to claim 1, wherein the solvent system is component c.

4. A polyurea elastomer solution according to claim 1, wherein the polyurea elastomer is a substantially linear polyurea elastomer prepared by chain-extending an isocyanate-terminated polyurethane prepolymer with diamine.

5. A polyurea elastomer solution according to claim 4, wherein the isocyanate-terminated polyurethane prepolymer is produced by reacting at least one glycol selected from the group of polyalkylene ether glycol and polyester glycol having a molecular weight of from 400 to 5,000 with a 1.05 to 2.00 molar ratio of organic diisocyanate to one mole of glycol, and the chain-extending diamine is a member of the group of hydrazine and an organic diamine containing from 2 to 8 carbon atoms between the nitrogen atoms.

References Cited

UNITED STATES PATENTS 3,068,188 12/1962 Beste et al. _____ 260—30.2
3,179,618 4/1965 Roberts _____ 260—34.2

FOREIGN PATENTS 1,021,533 12/1957 Germany.

MORRIS LIEBMAN, Primary Examiner

R. ZAITLEN, Assistant Examiner

U.S. Cl. X.R.

260—32.8